US008849434B1

(12) United States Patent
Pontual et al.

(10) Patent No.: US 8,849,434 B1
(45) Date of Patent: Sep. 30, 2014

(54) METHODS AND APPARATUS TO CONTROL AUDIO LEVELING IN MEDIA PRESENTATION DEVICES

(75) Inventors: Romulo Pontual, Hermosa Beach, CA (US); Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 455 days.

(21) Appl. No.: 12/649,143

(22) Filed: Dec. 29, 2009

(51) Int. Cl.
*G06F 17/00* (2006.01)

(52) U.S. Cl.
USPC ............................................................ 700/94

(58) Field of Classification Search
CPC ............ H04N 5/52; H04N 5/53; H04N 5/60; H04N 5/62; H04N 5/602; H03G 3/20
USPC .................................... 700/94; 381/104–109
See application file for complete search history.

(56) References Cited

U.S. PATENT DOCUMENTS

| 5,530,767 | A | 6/1996 | Yoshida |
| 5,945,988 | A | 8/1999 | Williams et al. |
| 6,552,753 | B1 | 4/2003 | Zhurbinskiy et al. |
| 6,909,471 | B2 * | 6/2005 | Bayley .......................... 348/738 |
| 7,012,652 | B1 * | 3/2006 | Weber ........................... 348/632 |
| 8,041,025 | B2 * | 10/2011 | Dolph et al. .............. 379/390.01 |
| 2004/0107442 | A1 * | 6/2004 | Bayley ............................ 725/93 |
| 2004/0199933 | A1 | 10/2004 | Ficco |
| 2005/0036069 | A1 * | 2/2005 | Lee et al. ...................... 348/632 |
| 2009/0316934 | A1 * | 12/2009 | Wollmershauser et al. .. 381/109 |
| 2011/0164855 | A1 * | 7/2011 | Crockett et al. .............. 386/230 |

OTHER PUBLICATIONS

ID3 tag version 2.3.0 informal standard; M.Nilsson, available to the public on Feb. 3, 1999, retrieved from http://id3.org/id3v2.3.0 on Nov. 27, 2012.*

* cited by examiner

*Primary Examiner* — Andrew C Flanders (57) ABSTRACT

Methods and apparatus to control audio leveling in media presentation systems are described. An example method for controlling audio leveling in a media presentation system includes receiving data including media content and metadata and selecting an audio leveling technique to be used in an audio leveling process based on the metadata.

20 Claims, 5 Drawing Sheets

METHODS AND APPARATUS TO CONTROL AUDIO LEVELING IN MEDIA PRESENTATION DEVICES

FIELD OF THE DISCLOSURE

The present disclosure relates generally to media presentation systems and, more particularly, to methods and apparatus to control audio leveling in media presentation devices.

BACKGROUND

Typically, media presentation systems receive streams of media content including a plurality of segments, some or all of which were generated by a different content source. The manner in which presentation devices output certain aspects of the media content, such as an audio level or volume, depends in part on the manner in which the corresponding content source is configured. Some media presentation systems use audio leveling to normalize the audio levels output by the presentation devices when, for example, an audio level compression of an audio signal is inconsistent from one segment of media content to another.

SUMMARY OF THE INVENTION

The example methods, apparatus, systems, and/or articles of manufacture described herein can be used to control audio leveling in media presentation devices. Generally, audio leveling is used to reduce audio level variances across, for example, different channels and/or different segments of media content. The example methods, apparatus, systems, and/or articles of manufacture described herein use metadata inserted into, for example, a stream of media content to enhance one or more operations of an audio leveler. Further, the example methods, apparatus, systems, and/or articles of manufacture described herein use additional or alternative information, such as, for example, information related to a status or operation of a media presentation device, to enhance one or more operations of an audio leveler.

An example method for controlling audio leveling in a media presentation system includes receiving data including media content and metadata and selecting an audio leveling technique to be used in an audio leveling process based on the metadata.

An example apparatus for controlling audio leveling in a media presentation system includes a receiver to receive data including media content and metadata and a selector to select an audio leveling technique to be used in the audio leveling process based on the metadata.

An example media presentation system includes a receiver station including an audio leveler to apply an audio leveling technique to the media content. In the example media presentation system, the example audio leveler includes a metadata extractor to extract the metadata. In the example media presentation system, the audio leveler includes a presentation system information detector to detect one or more aspects of a media presentation system to present the media content. In the example media presentation system, the example audio leveler includes a technique selector to select a first one of a plurality of audio leveling techniques to be applied to the media content based on the metadata. In the example media presentation system, the example audio leveler includes an audio level adjuster to apply the first one of the plurality audio leveling techniques to the media content wherein the metadata includes instructions dedicated to controlling the audio level adjuster. Other example implementations are possible.

DETAILED DESCRIPTION

The example methods, apparatus, systems, and/or articles of manufacture described herein may be implemented in connection with one or more transmission systems of any type including, for example, satellite broadcast systems, wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and/or fiber optic networks. Moreover, the example methods, apparatus, and/or articles of manufacture described herein may be implemented in connection with any type of media presentation system including, for example, a home entertainment system including a television coupled to a set-top box and/or any other type of receiver capable of receiving and processing media content. By way of illustration, an example transmission system and an example receiver are described below in connection with FIG. 1. However, the example methods, apparatus, systems, and/or articles of manufacture described herein may be implemented in connection with any other suitable type of transmission system and/or any other suitable type of receiver and/or any other suitable type of media presentation system.

Figure 1:
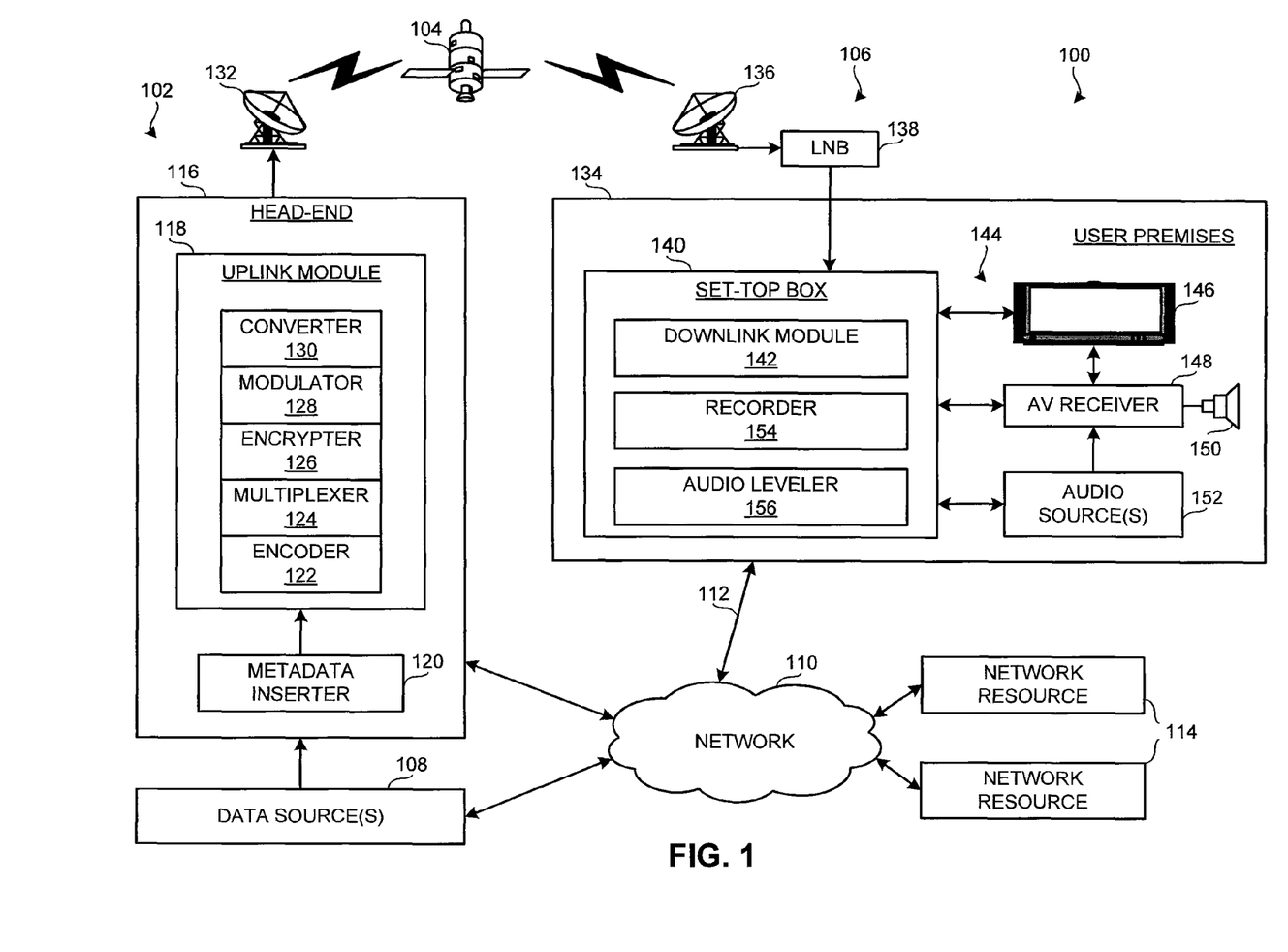
FIG. 1 is a diagram of an example direct-to-home (DTH) transmission and reception system.

FIG. 1 is a diagram of an example direct-to-home (DTH) transmission and reception system 100. The example DTH system 100 of FIG. 1 generally includes a transmission station 102, a satellite/relay 104, and a plurality of receiver stations, one of which is shown at reference numeral 106, between which wireless communications are exchanged at any suitable frequency (e.g., Ku-band frequencies). As described in detail below with respect to each portion of the system 100, information from one or more of a plurality of data sources 108 is transmitted from the transmission station 102 to the satellite/relay 104, which may be at least one geosynchronous or geo-stationary satellite. In turn, the satellite/relay 104 rebroadcasts the information received from the transmission station 102 over broad geographical area(s) including the receiver station 106. The example receiver station 106 of FIG. 1 is also communicatively coupled to the transmission station 102 via a network 110 such as, for example, the Internet, a local area network (LAN), a wide area network (WAN), a conventional public switched telephone network (PSTN), and/or any other suitable network system. A connection 112 (e.g., a terrestrial link via a telephone line) to the network 110 may also be used for supplemental communications (e.g., software updates, subscription information, programming data, information associated with interactive programming, etc.) with the transmission station 102 and/or may facilitate other general data transfers between the receiver station 106 one or more network resources 114 such as, for example, file servers, web servers, and/or databases (e.g., a library of on-demand programming).

The data sources 108 receive and/or generate video, audio, and/or audiovisual programming including, for example, television programming, movies, sporting events, news, music, pay-per-view programs, advertisement(s), game(s), etc. In the illustrated example, the data sources 108 receive programming from, for example, television broadcasting networks, cable networks, advertisers, and/or other content distributors. Further, the example data sources 108 of FIG. 1 include a source of program guide data that is used to display an interactive program guide (e.g., a grid guide that informs users of particular programs available on particular channels at particular times and information associated therewith) to an audience. Members of the audience can manipulate the program guide (e.g., via a remote control) to, for example, select a highlighted program for viewing and/or to activate an interactive feature (e.g., a program information screen, a recording process, a future showing list, etc.) associated with an entry of the program guide. Further, the example data sources 108 include a source of on-demand programming to facilitate an on-demand service.

An example head-end 116 at the transmission station 102 receives data from the data sources 108 and prepares the same for transmission to the satellite/relay 104. The example head-end 116 of FIG. 1 includes an uplink module 118 and a metadata inserter 120. Generally, the example metadata inserter 120 associates the content with certain information such as, for example, identifying information related to media content and/or instructions and/or parameters specifically dedicated to an operation of one or more audio leveling procedures. The example metadata inserter 120 and other example types of information to be inserted by the example metadata inserter 120 are described in greater detail below in connection with FIGS. 2-4. The example uplink module 118 includes an encoder 122, a multiplexer 124, an encrypter 126, a modulator 128, and a converter 130. During operation, information from the data sources 108 passes to the encoder 122, which encodes the information by for example, converting the information into data streams. The multiplexer 124 then multiplexes the data streams generated by the encoder 122 into a packetized data stream or bitstream using any of a variety of algorithms and/or techniques. Further, a header is attached to each data packet within the packetized data stream to facilitate identification of the contents of the data packet.

In the illustrated example, the data packet(s) are then encrypted by the encrypter 126 using any suitable technique capable of protecting the data packet(s) from unauthorized entities. Encrypted data packet(s) are conveyed to the modulator 128, which modulates a carrier wave with the encoded information. The modulated carrier wave is conveyed to the converter 130, which, in the illustrated example is an uplink frequency converter that converts the modulated, encoded bitstream to a frequency band suitable for reception by the satellite/relay 104. The modulated, encoded bitstream is then routed from the uplink frequency converter 130 to an uplink antenna 132 where it is conveyed to the satellite/relay 104.

The satellite/relay 104 receives the modulated, encoded bitstream from the transmission station 102 and broadcasts it downward toward an area on earth including the receiver station 106. The example receiver station 106 of FIG. 1 is located at a user premises 134 having a reception antenna 136 installed thereon that is coupled to a low-noise-block down-converter (LNB) 138, which amplifies and, in some examples, downconverts the received bitstream. In the illustrated example of FIG. 1, the LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver or the television 146.

The example set-top box 140 of FIG. 1 receives the signals originating at the head-end 116 and includes a downlink module 142 to process the bitstream. The example downlink module 142 of FIG. 1 demodulates, decrypts, demultiplexes, decodes, and/or otherwise processes the bitstream such that the content (e.g., audiovisual content) represented by the bitstream can be presented on a display device of, for example, a media presentation system 144. The example media presentation system 144 of FIG. includes a television 146, an AV receiver 148 coupled to a sound system 150, and one or more audio sources 152. As shown in FIG. 1, the set-top box 140 may route signals directly to the television 146 and/or via the AV receiver 148. The AV receiver 148 is capable of controlling the sound system 150, which can be used in conjunction with, or in lieu of, the audio components of the television 146. The set-top box 140 is responsive to user inputs to, for example, tune to a particular channel of the received data stream, thereby displaying the particular channel on the television 146 and/or playing an audio stream of the particular channel (e.g., a channel dedicated to a particular genre of music) using the sound system 148 and/or the audio components of the television 146. The audio source(s) 152 include additional or alternative sources of audio information such as, for example, an MP3 player (e.g., an Apple® iPod®), a Blueray® player, a Digital Versatile Disc (DVD) player, a compact disc (CD) player, a personal computer, etc.

Further, the example set-top box 140 of FIG. 1 includes a recorder 154 capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

The example set-top box 140 of FIG. 1 includes an audio leveler 156 capable of implementing the example methods, apparatus, systems, and/or articles of manufacture described herein. While the illustrated example of FIG. 1 depicts the example audio leveler 156 implemented in the example set-top box 140, the audio leveler 156 and/or one or more components thereof can be implemented in additional or alternative locations, devices, and/or components. In some examples, the audio leveler 156 is implemented in the television 146, the AV receiver 148, one or more of the audio source(s) 152, and/or any other media presentation device associated with and/or having audio components (e.g., an AM or FM radio of an automobile capable of tuning to a plurality of channels).

Generally, audio leveling is used to reduce or mitigate audio level variances across, for example, different segments of media content. An audience may experience such variances for a plurality of reasons. For example, an audience consuming a first segment of media content (e.g., television program) may abruptly change to consuming a second segment of media content (e.g., a commercial) by, for example, instructing a media presentation device (e.g., the example set-top box 140 of FIG. 1) to tune to a different channel or by reaching a break point (e.g., a commercial break) in television programming. Because certain aspects (e.g., an audio level compression configuration) of the first and second media segments may be configured differently (e.g., a first one of the data sources 108 configuring the first media segment and a second one of the data sources 108 configuring the second media segment), the abrupt change in the media being consumed may result in an abrupt change in the volume output by, for example, the television 146 of FIG. 1.

A conventional audio leveler is configured to detect such sharp change(s) in audio levels and to apply an audio leveling technique or algorithm to the corresponding audio signals to reduce the impact of the inconsistency between audio levels. For example, the audio leveling technique or algorithm may raise or lower the amplification applied to the audio signal based on a current audio level and an average audio level over an immediately previous period of time.

However, conventional audio levelers often adjust the audio output of a media presentation device in unwarranted situations. Media content often includes intentional drastic or sharp changes in audio levels. For example, a creator of an action movie may intentionally draw in an audience using a quiet scene preceding a surprisingly noisy event (e.g., an explosion). In another example, an audience may be consuming a highly dynamic classical music concert including many dramatic changes in volume (e.g., a clashing of cymbals following a period of silence). Altering the audio level in an attempt to mitigate these intentional variances negatively affects the audience experience during consumption of the media content. That is, the intended impact of some drastic changes in volume is lost when conventional audio leveling techniques or algorithms are applied to media content to remove such volume changes.

The example audio leveler 156 of FIG. 1 increases the effectiveness of audio leveling techniques when appropriate, as well as decreases and/or eliminates instances in which audio leveling techniques are misapplied or applied at inappropriate moments. Thus, the example audio leveler 156 enhances the audience experience of the media by eliminating volume variances that are "unwanted" while leaving desired volume variances. In particular, the example audio leveler 156 enables a selection of one or more audio leveling options or settings based on, for example, what type of media content is currently being consumed, a state of a media presentation device, and/or specific instructions regarding an audio leveling process inserted into the corresponding media content. To obtain the information on which the example audio leveler 156 bases the selection of the one or more audio leveling options or settings, the example audio leveler 156 extracts information inserted into a media content data stream and/or obtains information related to a media presentation device involved in the output of audio signals. The example audio leveler 156 uses the extracted and/or obtained information to determine whether audio leveling is to be applied to an audio output and/or or to determine which of a plurality of audio leveling algorithms is to be applied to the audio output. Thus, the example audio leveler 156 controls one or more audio leveling procedures based on the characteristics of media content and/or an operational status of a device presenting the media content. In some examples, additional or alternative information may be used to control the one or more audio leveling procedures.

Figure 2:
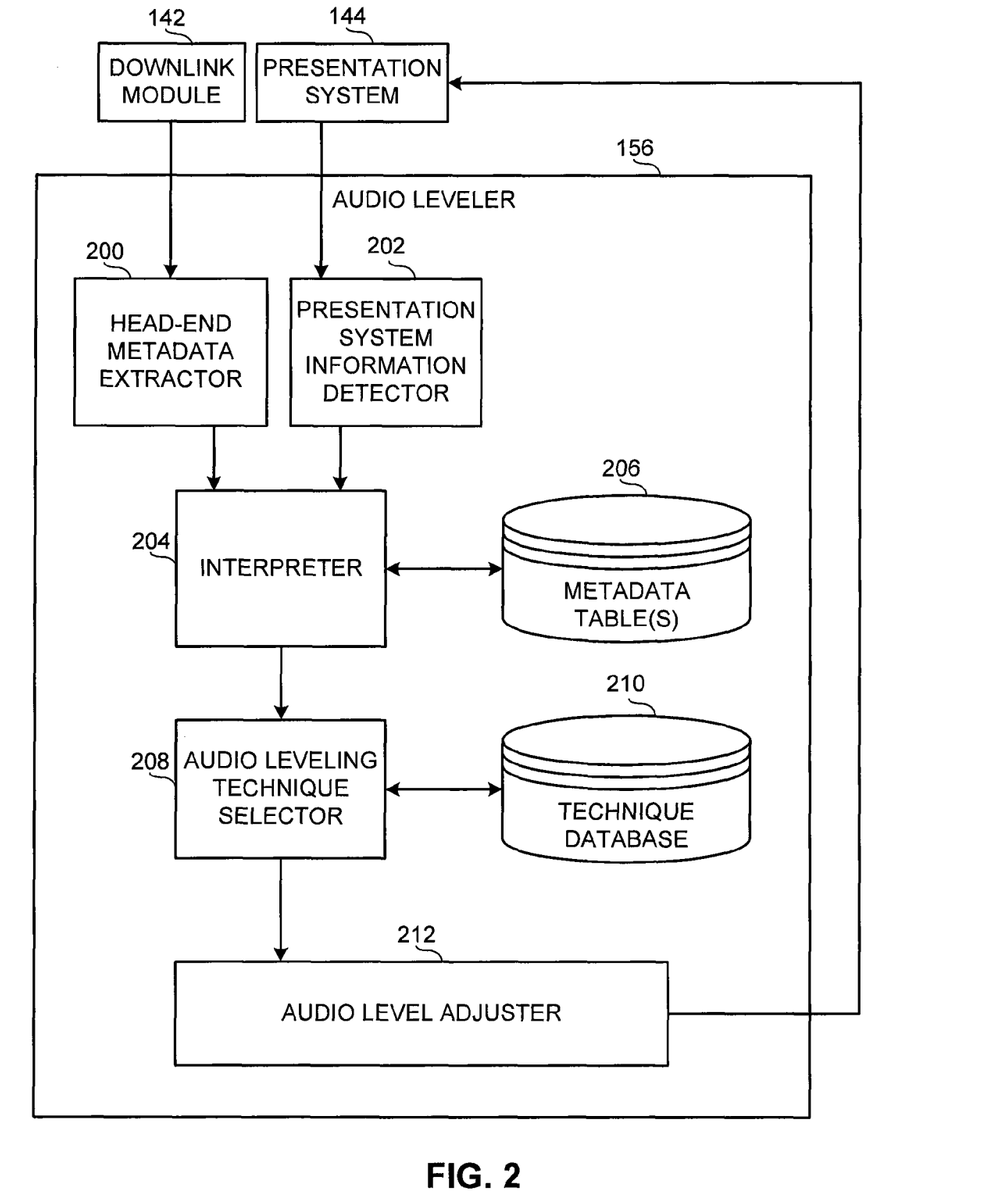
FIG. 2 is a block diagram of an example apparatus that may be used to implement the example audio leveler of FIG. 1.

FIG. 2 is a block diagram of an example apparatus that may be used to implement the example audio leveler 156 of FIG. 1. In the illustrated example of FIG. 2, the example audio leveler 156 includes a head-end metadata extractor 200, a presentation system information detector 202, an interpreter 204, one or more tables 206, an audio leveling technique selector 208, an audio leveling technique database 210, and an audio level adjuster 212. While an example manner of implementing the audio leveler 156 of FIG. 1 has been illustrated in FIG. 2, one or more of the elements, processes and/or devices illustrated in FIG. 2 may be combined, divided, rearranged, omitted, eliminated and/or implemented in any other way.

Further, the example head-end metadata extractor 200, the example presentation system information detector 202, the example interpreter 204, the example table(s) 206, the example audio leveling technique selector 208, the example audio leveling technique database 210, the example audio level adjuster 212, and/or, more generally, the example audio leveler 156 of FIG. 2 may be implemented by hardware, software, firmware and/or any combination of hardware, software and/or firmware. Thus, for example, any of the example head-end metadata extractor 200, the example presentation system information detector 202, the example interpreter 204, the example table(s) 206, the example audio leveling technique selector 208, the example audio leveling technique database 210, the example audio level adjuster 212, and/or, more generally, the example audio leveler 156 of FIG. 2 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example head-end metadata extractor 200, the example presentation system information detector 202, the example interpreter 204, the example table(s) 206, the example audio leveling technique selector 208, the example audio leveling technique database 210, the example audio level adjuster 212, and/or, more generally, the example audio leveler 156 of FIG. 2 are hereby expressly defined to include a tangible medium such as a memory, DVD, CD, etc., storing the software and/or firmware. Further still, the example audio leveler 156 of FIG. 2 may include one or more elements, processes and/or devices in addition to, or instead of, those illustrated in FIG. 2, and/or may include more than one of any or all of the illustrated elements, processes and devices.

As described above, the example set-top box 140 receives a data stream including media content and metadata transmitted from the head-end 116. The example head-end metadata extractor 200 receives the data stream and extracts head-end metadata to be used by the example audio leveler 156 in controlling one or more aspects of the audio leveling procedure(s) described herein. Some or all of the head-end metadata is inserted into the data stream by the example metadata inserter 120. Additionally or alternatively, the metadata may be already present in the content provided to the example head-end 116 by the data source(s) 108. Alternatively, the metadata could be synced with the media, but sent through a different path (e.g., via the network 110.

Example metadata includes identifying information related to the media content of the data stream such as, for example, an identifier of a title of programming, a genre, a program description, a channel description, a listing of cast members, etc. Other example metadata includes closed captioning data used to visually represent the audio content of the data stream (e.g., using a graphical overlay displayed with the media content). Other example metadata includes information on the number and type(s) of auxiliary audio streams transmitted by the transmission station 102 (e.g., different audio streams, interactive data feeds, etc. that can be selected by the user at the user premises 134 for presentation on the media presentation system 144). Other example metadata includes instructions and/or parameters specifically dedicated to an operation of one or more audio leveling procedures and/or techniques. That is, the example metadata inserter 120 of FIG. 1 is configured to enable an administrator associated with the example head-end 116 to insert data corresponding to an audio leveling procedure into the data stream to be received by the head-end metadata extractor 200. The data corresponding to an audio leveling procedure, in some examples, may be generated through a special pre-processing of the audio stream(s) performed at the head-end 116 and/or a corresponding one of the data source(s) 108.

The example head-end metadata extractor 200 is configured to extract the head-end metadata described above and/or additional or alternative data of the data stream transmitted from the head-end 116. In the illustrated example, the head-end metadata extractor 200 conveys the extracted metadata to the example interpreter 204, which is described in detail below.

The example presentation system information detector 202 obtains and/or generates information related to an operation and/or status of the set-top box 140, the television 146, the AV receiver 148, one or more of the audio sources 152, and/or any other component of the set-top box 140 and/or the media presentation system 144. That is, the example presentation system information detector 202 retrieves certain information and/or detects certain actions and/or statuses associated with one or more components configured to present the media content of the received data stream.

Example presentation system information includes a signal indicative of a change of a channel being presented by the television 146 and/or a change of a station being output by the AV receiver 148 (e.g., a radio station). For example, a user input transmitted to the set-top box 140 and/or the television 146 causing the set-top box 140 and/or the television 146 to tune to a different channel is detectable by the example presentation system information detector 202 of FIG. 2. Further, a user input transmitted to the AV receiver 148 to tune to a different radio station is detectable by the example presentation system information detector 202 of FIG. 2. Other example presentation system information includes a signal indicative of a change in volume being output by the television 146 and/or the AV receiver 148. For example, a user input transmitted to the set-top box 140, the television 146, and/or the AV receiver 148 causing the set-top box 140, the television 146, and/or the AV receiver 148 to adjust a volume level is detectable by the example presentation system information detector 202 of FIG. 2. Other example presentation system information includes which of a plurality of audio streams (e.g., when a portion of media content includes multiple auxiliary audio streams capable of being presented with the visual media content) is to be output by the television 146 and/or the AV receiver 148. For example, a signal indicative of which audio stream is being presented on the television 146 and/or the AV receiver 148 is detectable by the example presentation system information detector 202.

The example presentation system information detector 202 is configured to obtain or detect the presentation system information described above and/or additional or alternative data associated with the set-top box 140, one or more components of the example media presentation system 144, and/or any other component of any media presentation system. In the illustrated example, the presentation system information detector 202 conveys the extracted data information to the example interpreter 204.

The example interpreter 204 receives head-end metadata from the head-end metadata extractor 200 and presentation system information from the presentation system information detector 202. In some examples, the head-end metadata and/or the presentation system information is representative information, such as a code, corresponding to substantive information usable by the example audio leveler 156 or, more particularly for the illustrated example, the example audio leveling technique selector 208 described in detail below. Usable information to be conveyed to the example audio leveling technique selector 208 includes, for example, an identifier to inform the example technique selector 208 of an identity of the programming, a genre or type of the programming, specific instructions dedicated to the audio leveling procedures described herein, and/or other information described in greater detail below in connection with the example technique selector 208. The example metadata interpreter 204 uses the representative information to reference the table(s) 206. The example table(s) 206 include the substantive information usable by the example technique selector 208 that corresponds to the representative information received from the head-end metadata extractor 200 and/or the presentation system information detector 202. In the illustrated example, the table(s) 206 are indexed lookup tables having a correspondence between representative information (e.g., a code) and usable information.

For example, a first code received from the head-end metadata extractor 200 corresponds to a first genre (e.g., drama movie) associated with the media content corresponding to the first code. Thus, the table(s) 206 inform the interpreter 204 that the media content corresponding to the first code is a dramatic movie. In another example, a second code received from the head-end metadata extractor 200 corresponds to a title or identifier of a media segment (e.g., a television program). Thus, the table(s) 206 inform the interpreter 204 that the media content corresponding to the second code is the identified media segment. In another example, a third code received from the presentation system information detector 202 corresponds to a channel change user input. Thus, the table(s) 206 inform the interpreter 204 that one or more components of the media presentation system 144 is changing channels. Additional or alternative types of usable information, some examples of which are described herein, are possible.

In some examples, the head-end metadata and/or the presentation system information is transmitted and received in a form or format that is directly usable (e.g., without a need for translation) by the example audio leveling technique selector 208. In such instances, the example interpreter 204 of FIG. 2 does not reference the example table(s) 206 and directly conveys the usable information to the example technique selector 208.

The example audio leveling technique selector 208 is configured to select one or more audio leveling options, algorithms, and/or settings based on the information received from the example interpreter 204. When the example technique selector 208 selects a certain audio leveling technique to be applied to an audio output (e.g., of the television 146, the AV receiver 148, etc.), the technique selector 208 retrieves the selected technique from the example audio leveling technique database 210. The example technique database 210 includes a plurality of audio leveling techniques and/or information related thereto. Further, the example technique database 210 is updated (e.g., periodically or aperiodically) with additional or alternative information related to the audio leveling procedure(s) described herein. In the illustrated example, the example technique database 210 is provided with updates via the network connection 112, which communicatively couples the technique database 210 with the one or more network resources 114 and the example head-end 116 of FIG. 1.

The example audio leveling technique selector 208 employs a set of criteria using the head-end metadata and/or the presentation system information to determine which, if any, of the audio leveling techniques stored in the technique database 210 to apply to the corresponding media content (e.g., the media content associated with the extracted head-end metadata and/or the media content currently being presented on the media presentation system 144) and what setting(s), if any, specific to that audio leveling technique to utilize with the applied technique. Some audio leveling techniques may be more adept at normalizing audio output levels in certain situations than other audio leveling techniques. For example, aggressive audio leveling techniques, which adjust amplification levels at a greater magnitude than other, passive, techniques, may be more suitable in a channel change situation. Additionally or alternatively, an aggressive audio leveling technique may, for example, have a plurality of settings corresponding to, for example, its response time that may be selected based on specific characteristics of the channel change (e.g., from a non-music channel to a music channel).

Thus, in situations and/or media content determined to be vulnerable to inappropriately applied audio leveling, the example technique selector 208 selects a passive audio leveling technique. Alternatively, the example technique selector 208 may select no audio leveling technique to be applied to the vulnerable media content, such that no audio leveling is applied to the corresponding audio output. In contrast, in situations and/or media content determined to be highly subject to undesirable sharp audio changes, the example technique selector 208 selects an aggressive audio leveling technique. In situations and/or media content determined to be moderately subject to undesirable sharp audio changes, the example technique selector 208 selects a moderate audio leveling technique.

As an illustrative example, when head-end metadata indentifies the corresponding media content as a highly dynamic music concert (e.g., by title, genre, a program description, a channel identifier used in conjunction with program guide information, etc.), the example technique selector 208 restricts an audio leveling procedure from altering the audio output associated with the music concert by, for example, selecting a 'NULL' technique (e.g., a technique that always concludes that no adjustment is to be made), by not selecting a technique, or by changing a setting associated with the audio leveler 156 to 'OFF.' Alternatively, the example audio leveler 156 of FIG. 1 may apply a passive audio leveling technique to the audio corresponding to the music concert instead of disabling the audio leveling procedure altogether.

As another illustrative example, when head-end metadata and/or presentation system information identifies which of a plurality of available audio streams (e.g., stereo audio and Dolby Digital 5.1 audio) is to be output by the media presentation system 144, the example technique selector 208 selects an appropriate technique based on the known characteristics of the selected audio stream.

As another illustrative example, when head-end metadata includes textual information representative of closed captioning data, the example technique selector 208 uses the textual information to garner indicators of the type of media content being presented. For example, when the closed captioning information includes an indicator of music being played without any dialogue, the example technique selector 208 selects a passive technique. In another example, when the closed captioning information includes an indicator of dramatic language (e.g., exclamation marks, capitalized letters, expletives, etc.), the example technique selector 208 selects a moderate technique. In this example, the technique selector 208 selects different techniques to be applied at different times in a segment of media content.

As another illustrative example, when the head-end metadata identifies a breakpoint in the media content indicative of a commercial break, the example technique selector 208 selects an aggressive audio leveling technique to normalize any drastic volume changes typically caused by excessively loud commercials. In such instances, the example technique selector 208 may select the aggressive technique for a certain period of time before and after the identified breakpoint, and may choose to return to, for example, a moderate technique for the remainder of the media content. Thus, the example technique selector 208 may apply a passive or moderate technique during a television program but may then switch to an aggressive technique immediately prior the identified breakpoint associated with a commercial break and when returning from the commercial break.

As another illustrative example, when the presentation system information indicates that a user input associated with channel change is received, the example technique selector 208 selects a highly aggressive audio leveling technique to normalize any drastic volume changes typically caused by different compression configurations and/or amplification levels used by content sources and/or different channels. In the illustrated example, the detected channel change causes the example technique selector 208 to select the most aggressive technique.

As another illustrative example, when the presentation system information indicates that a user input associated with a volume change is received, the example technique selector 208 selects to alter a currently applied technique, if necessary, to comply with the request of the user to increase or decrease the volume. That is, a request to increase or decrease the volume determines whether a more passive or more aggressive technique is appropriate at the time of the user request.

As another illustrative example, when the head-end metadata includes information specific to audio characteristics of the media content (e.g., data inserted by the metadata inserter 120 as specific instructions to the audio leveler 156), the example technique selector 208 selects a technique according to the specified audio characteristics. In one such example, the metadata inserter 120 inserts metadata indicative of data used in an audio encoding process associated with the media content. The inserted metadata includes information such as, for example, real-time dynamic range statistics that specify audio characteristics of the media content at different times thereof. Thus, the metadata indicates that a certain volume range occurs at a first point in the media content and that another volume range occurs at a second point in the media content. The example technique selector 208 uses the dynamic range statistics to dynamically select an appropriate technique and/or technique setting(s) for the different points (e.g., a period of time) in the media content.

Additionally or alternatively, the technique selector 208 may store one or more of the selections made thereby. The selection information can be used identify one or more trends, likelihoods, tendencies, etc. associated with selection of the audio leveling techniques. Thus, if a user input corresponding to a volume increase often (e.g., above a certain frequency) results in a selection of a certain audio leveling technique, the example technique selector 208 factors in such a tendency in the determination of which audio leveling technique to apply for a given situation. In another example, if a program of a certain genre often causes a selection of a certain audio leveling technique, the example technique selector 208 uses the stored information to determine that the often selected technique should be applied to a future program of the same genre. That is, the example technique selector 208 can use a history of its selections to guide its calculations associated with selected an appropriate audio leveling technique.

When the example technique selector 208 determines which, if any, of the techniques stored in the database 210 to apply at a given time, the selected technique is conveyed to the example audio level adjuster 212. The example audio level adjuster 212 is communicatively coupled to, for example, the television 146 and has access to and the capability of altering the audio output of the television 146 and/or any other audio component of the media presentation system 144. As audio leveling techniques typically require calculations to be performed on the audio content over time, the audio level adjuster 212 can be instructed by the technique selector 208 to perform calculations on the audio content for more than one technique or algorithm simultaneously. However, at any given moment the results of only one technique or algorithm, as determined by the technique selector 218, is applied to the audio content.

Figure 3:
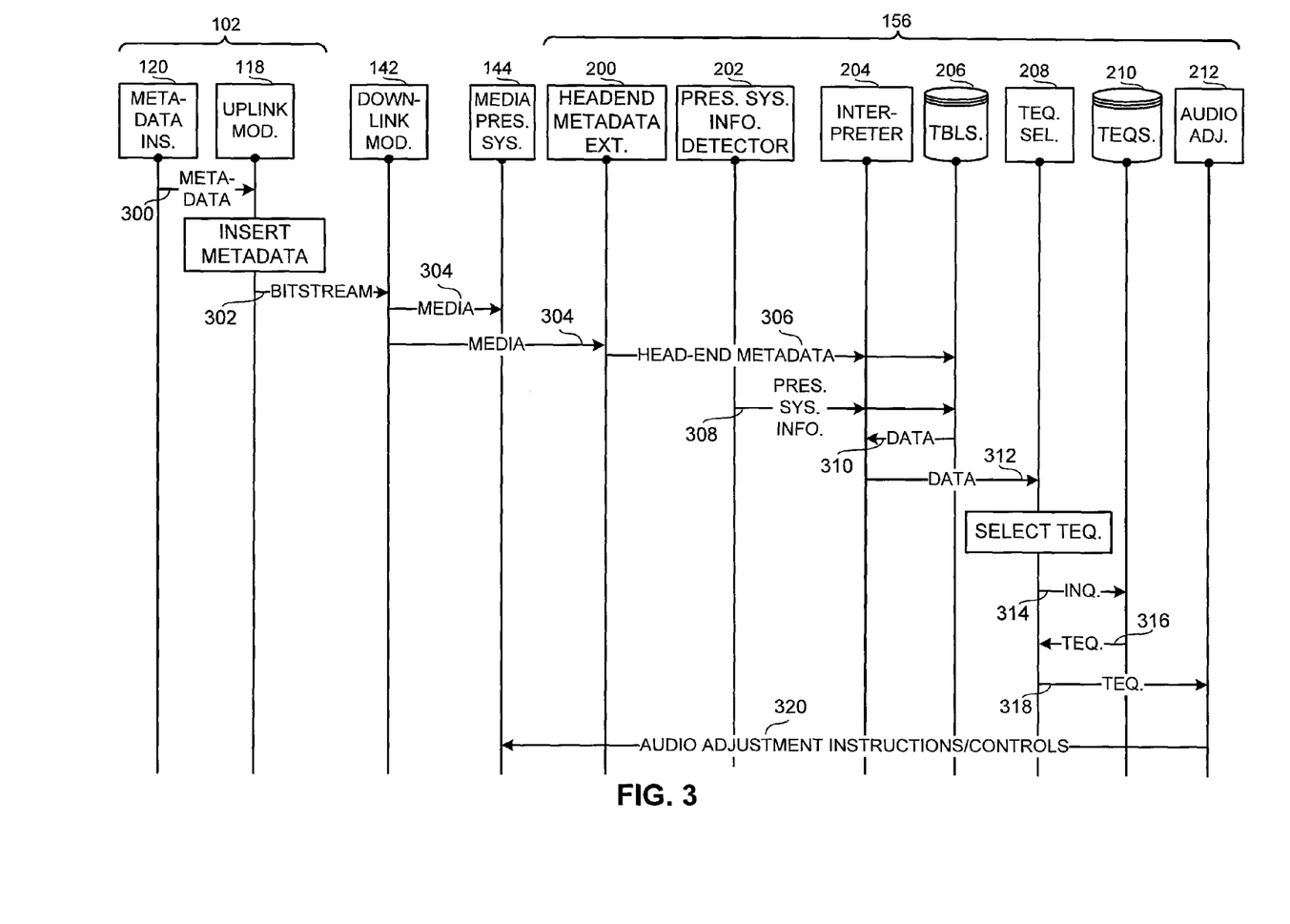
FIG. 3 is a sequence diagram representing an example process that may be performed by the example DTH transmission and reception system of FIG. 1.

FIG. 3 is a sequence diagram representing a process that may be performed by the example DTH transmission and reception system of FIG. 1. In particular, the example sequence diagram of FIG. 3 involves the example transmission station 102 of FIG. 1, the example downlink module 142 of FIG. 1, the example media presentation system 144 of FIG. 1, and the example audio leveler 156 of FIGS. 1 and/or 2. The example sequence diagram depicted in FIG. 3 is representative of machine readable instructions that can be executed to implement the example transmission station 102 of FIG. 1, the example downlink module 142 of FIG. 1, the example media presentation system 144 of FIG. 1, and the example audio leveler 156 of FIGS. 1 and/or 2. The example processes of FIG. 3 may be performed using a processor, a controller and/or any other suitable processing device. For example, the example processes of FIG. 3 may be implemented in coded instructions stored on a tangible medium such as a flash memory, a read-only memory (ROM) and/or random-access memory (RAM) associated with a processor (e.g., the example processor 512 discussed below in connection with FIG. 5). Alternatively, some or all of the example processes of FIG. 3 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 3 may be implemented manually or as any combination(s) of any of the foregoing techniques, for example, any combination of firmware, software, discrete logic and/or hardware. Further, although the example processes of FIG. 3 are described with reference to the flow diagram of FIG. 3, other methods of implementing the processes of FIG. 3 may be employed. For example, the order of execution of the exchanges of information may be changed, and/or some of the exchanges described may be changed, eliminated, sub-divided, or combined. Additionally, any or all of the example processes of FIG. 3 may be performed sequentially and/or in parallel by, for example, separate processing threads, processors, devices, discrete logic, circuits, etc.

In the illustrated example of FIG. 3, the metadata inserter 120 conveys metadata 300 to the uplink module 118. As described above, the metadata 300 includes, for example, identifying and/or descriptive information associated with the media content into which the metadata 300 is to be inserted, specific instructions and/or parameters (e.g., real-time dynamic range statistics associated with the audio portion of the corresponding media content), closed captioning information, etc. As shown in FIG. 3, the uplink module 118 inserts the metadata 300 into data (e.g., media content received from the data source(s) 108) to form a bitstream 302. The bitstream 302 is conveyed (e.g., via the uplink antenna 132, the satellite/relay 104, the downlink antenna 136, and the LNB 138) to the downlink module 142. The downlink module 142 processes the bitstream and conveys the resulting media 304 to the media presentation system 144. Further, the downlink module 142 conveys the media (including any inserted head-end metadata) 304 to the head-end metadata extractor 200. The head-end metadata extractor 200 extracts the head-end metadata 306 and conveys the same to the interpreter 204. The presentation system information detector 202 obtains any available presentation system information 308 and conveys the same to the interpreter 204.

In the illustrated example, head-end metadata 306 is conveyed to the interpreter 204 and, in turn, conveyed to the table(s) 206. The presentation system information 308 is also conveyed to the interpreter 204 and, in turn, conveyed to the table(s) 206. As described above in connection with FIG. 2, the example interpreter 204 determines whether the head-end metadata 306 and/or the presentation system information 308 is representative data and, if so, uses the table(s) 206 to obtain the substantive information to be used in selecting an appropriate audio leveling technique. In the illustrated example, the table(s) 206 return the usable data 310 to the interpreter 204, which conveys the usable data 312 to the technique selector 208.

As described above, the technique selector 208 selects an appropriate technique using the data 312. In some instances, the technique selector 208 selects an audio leveling technique to be applied to an entire program and/or until another technique is triggered (e.g., by presentation system information indicating a channel change). In some instances, the technique selector 208 selects a first technique to be applied to the media content during a first period of time and a second technique to be applied to the media content during a second period of time. In some instances, the technique selector 208 reacts to user inputs by selecting a technique for a relatively short period of time before returning to a previously applied technique. Additional or alternative audio leveling schemes and/or timing selections are possible.

The technique selector 208 sends an inquiry 314 to the audio leveling technique database 210 and the technique database returns the selected technique 316. The technique selector 208 conveys the selected technique 318 (including specific settings for that technique) to the audio level adjuster 212. As described above, the audio level adjuster 212 has access to and is capable of controlling an audio output of one or more devices of the example media presentation system 144. In the illustrated example, the audio level adjuster 212 conveys audio adjustment instructions or controls to the media presentation system 144 based on an output of the selected technique 318. Thus, the head-end metadata 306 and/or the presentation system information 308 controls an audio leveling selection procedure that controls the volume of a media presentation as described herein.

Figure 4:
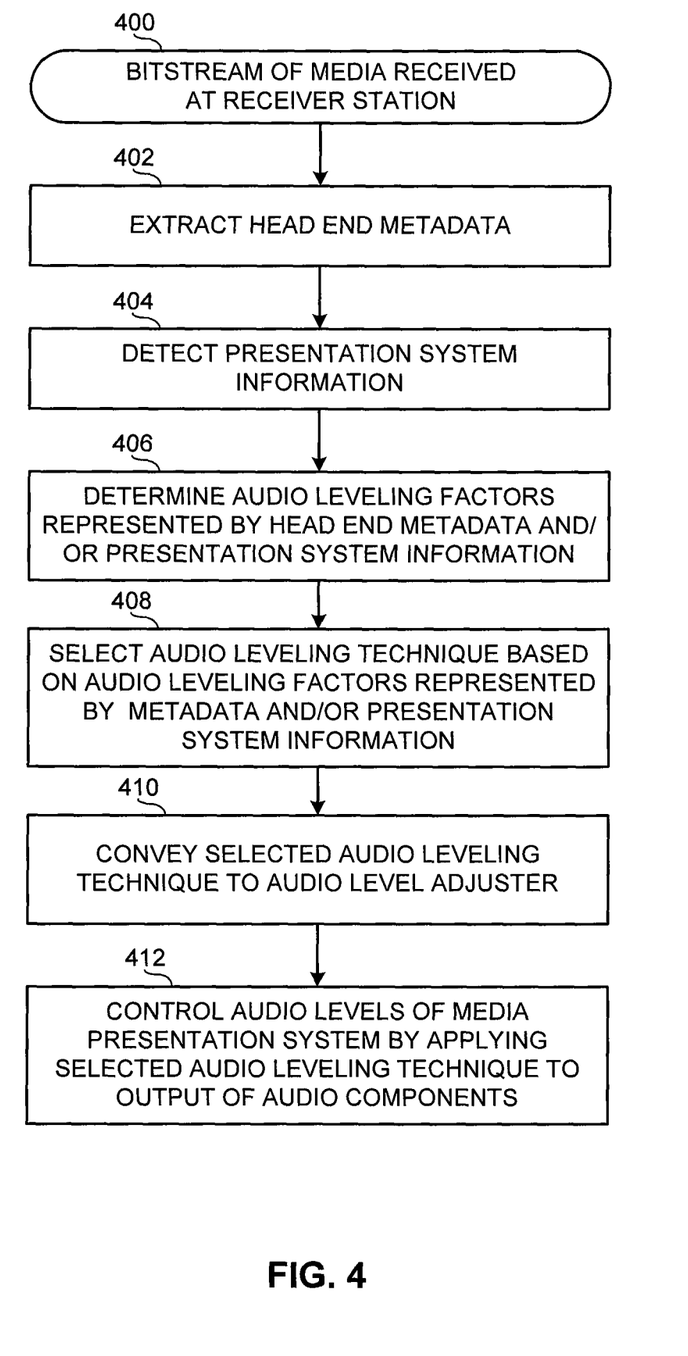
FIG. 4 is a flowchart representing an example process that may be performed by the example audio leveler of FIGS. 1 and/or 2.

The flow diagram depicted in FIG. 4 is representative of a process that may be implemented using machine readable instructions that can be executed to implement the example audio leveler 156 of FIGS. 1 and/or 2. The example processes of FIG. 4 may be performed using a processor, a controller and/or any other suitable processing device. For example, the example processes of FIG. 4 may be implemented in coded instructions stored on a tangible medium such as a flash memory, a read-only memory (ROM) and/or random-access memory (RAM) associated with a processor (e.g., the example processor 512 discussed below in connection with FIG. 5). Alternatively, some or all of the example processes of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 4 may be implemented manually or as any combination(s) of any of the foregoing techniques, for example, any combination of firmware, software, discrete logic and/or hardware. Further, although the example processes of FIG. 4 are described with reference to the flow diagram of FIG. 4, other methods of implementing the processes of FIG. 4 may be employed. For example, the order of execution of the blocks may be changed, and/or some of the blocks described may be changed, eliminated, sub-divided, or combined. Additionally, any or all of the example processes of FIG. 4 may be performed sequentially and/or in parallel by, for example, separate processing threads, processors, devices, discrete logic, circuits, etc.

A bitstream of data including media content and metadata is received at the example receiver station 106 (block 400). As illustrated in FIG. 1, the example receiver station 106 includes a set-top box 140. In the illustrated example, the set-top box 140 includes the audio leveler 156. However, in some examples, the audio leveler 156 is implemented in additional or alternative devices(s) of the media presentation system 144. For example, the audio leveler 156 can be implemented in the television 146, the AV receiver 148, one or more of the audio source(s) 152, and/or any other type of device associated with any other type of media presentation system.

The audio leveler 156 receives the bitstream and conveys the same to the head-end metadata extractor 200 of FIG. 2. The head-end metadata extractor 200 extracts the head-end metadata (examples of which are described above) to be used in controlling and/or influencing the techniques or algorithms used by the audio leveler 156 (block 402). Further, the example presentation system information detector 202 detects information related to the media presentation system 144 (examples of which are described above) to be used in controlling and/or influencing the operation of the audio leveler 156 (block 404). The example interpreter 204 determines or identifies the audio leveling factors represented by the extracted head-end metadata and/or the presentation system information by, for example, referencing the table(s) 206 using the metadata and/or detected information (block 406).

The example technique selector 208 then uses the head-end metadata, the presentation system information, and/or a combination thereof to select one or more audio leveling techniques to be applied to the corresponding media content (block 408). The selected technique is conveyed to the example audio level adjuster 212 (block 410), which controls an audio level of one or more devices of the media presentation system 144 by applying the selected audio leveling technique thereto (block 412).

Figure 5:
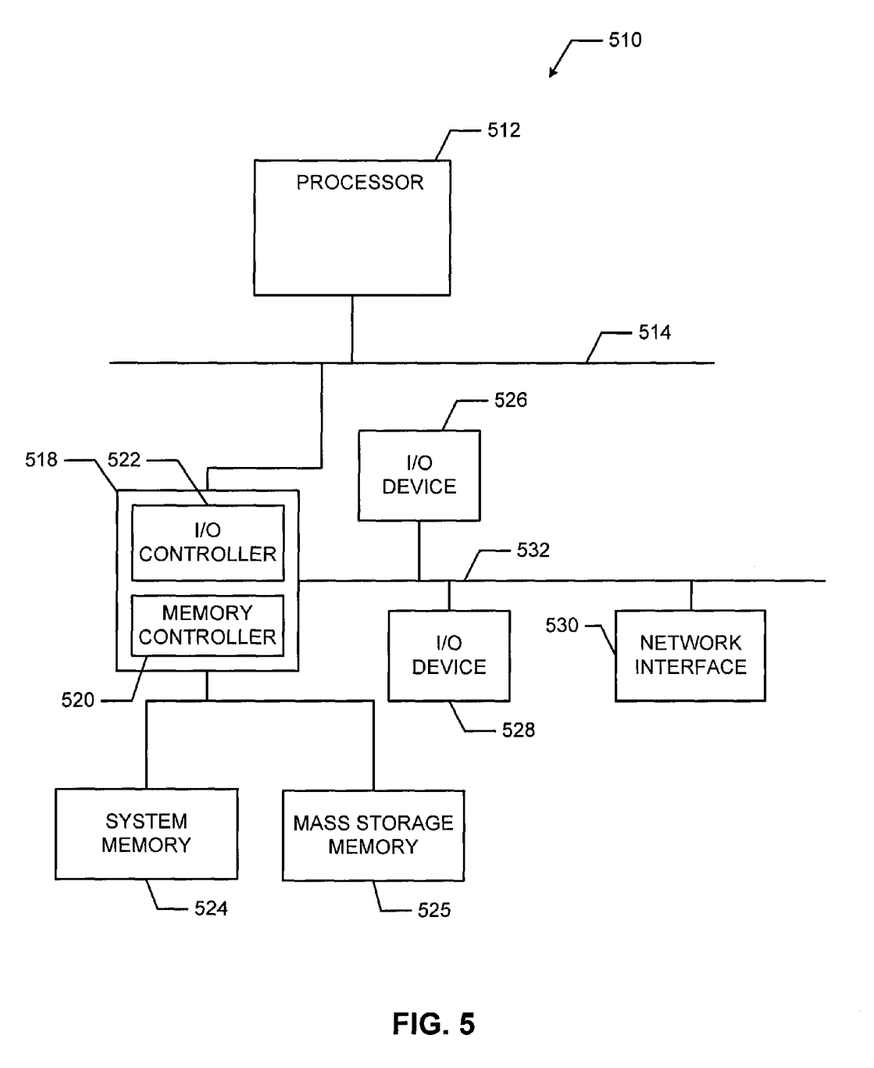
FIG. 5 illustrates an example manner of implementing an example processor unit to implement and/or execute the example methods, apparatus, systems, and/or articles of manufacture described herein.

FIG. 5 is a block diagram of an example processor system 510 that may be used to implement the apparatus and methods described herein. As shown in FIG. 5, the processor system 510 includes a processor 512 that is coupled to an interconnection bus 514. The processor 512 may be any suitable processor, processing unit or microprocessor. Although not shown in FIG. 5, the system 510 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and an input/output (I/O) controller 522. As is well known, a chipset typically provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate blocks within the chipset 518, the functions performed by these blocks may be integrated within a single semiconductor circuit or may be implemented using two or more separate integrated circuits.

The methods, apparatus, systems, and/or articles of manufacture described above are non-limiting examples. Although the example methods, apparatus, systems, and/or articles of manufacture described herein include, among other components, software executed on hardware, such methods, apparatus, systems, and/or articles of manufacture are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Further, although certain example methods, apparatus, systems, and/or articles of manufacture have been described herein, the scope of coverage of this patent is not limited thereto. On the contrary, this patent covers all methods, apparatus, systems, and/or articles of manufacture fairly falling within the scope of the appended claims either literally or under the doctrine of equivalents.

What is claimed is:

1. A method for controlling audio leveling in a media presentation system, comprising:
receiving data including media content;
identifying a measure of vulnerability of a portion of the media content to inappropriate audio leveling based on an indicator in closed captioning data corresponding to the portion of the media content;
selecting, via processor, a level of aggressiveness for an audio leveling technique to be used in the audio leveling process based on the measure of vulnerability.

2. A method as defined in claim 1, further comprising selecting one or more settings associated with the selected audio leveling technique to be used in the audio leveling process.

3. A method as defined in claim 2, wherein selecting the one or more settings to be used in the audio leveling process comprises choosing whether or not to apply the audio leveling process to the media content.

4. A method as defined in claim 1, wherein identifying the measure of vulnerability comprises determining a characteristic of the portion of the media content using the indicator in the closed captioning data.

5. A method as defined in claim 4, wherein the indicator is at least one of an exclamation mark, a capitalized letters, or an indication of an expletive.

6. A method as defined in claim 1, wherein selecting the level of aggressiveness for the audio leveling technique includes selecting a first technique to be applied to the media content during a first period of time and selecting a second technique to be applied to the media content during a second period of time.

7. A method as defined in claim 1, further comprising selecting the level of aggressiveness for the audio leveling technique based on information related to the media presentation system.

8. A method as defined in claim 7, wherein the information related to the media presentation device includes at least one of a first user input corresponding to a channel change, a second user input corresponding to a volume change, or a selection of one of a plurality of audio streams associated with the media content.

9. A method as defined in claim 1, further comprising selecting the level of aggressiveness for the audio leveling technique based on metadata inserted into a data stream including the media content at a head-end of a direct-to-home satellite transmission system.

10. An apparatus for controlling audio leveling in a media presentation system, comprising:
a receiver to receive data including media content; and
a selector to:
identify a measure of vulnerability of a portion of the media content to inappropriate audio leveling based on an indicator in closed captioning data corresponding to the portion of the media content; and
select a level of aggressiveness for an audio leveling technique to be used in the audio leveling process based on the measure of vulnerability, wherein the selector is implemented via a processor.

11. An apparatus as defined in claim 10, wherein the selector is to select one or more settings associated with the selected audio leveling technique to be used in the audio leveling process.

12. An apparatus as defined in claim 11, wherein the selector is to select the one or more settings to be used in the audio leveling process by choosing whether or not to apply the audio leveling process to the media content.

13. An apparatus as defined in claim 10, wherein the selector is to identify the measure of vulnerability by determining a characteristic of the portion of the media content using the indicator in the closed captioning data.

14. An apparatus as defined in claim 13, wherein the indicator is at least one of an exclamation point, capitalized letters, or an indication of an expletive.

15. An apparatus as defined in claim 10, wherein the selector is to select the level of aggressiveness for the audio leveling technique by selecting a first technique to be applied to the media content during a first period of time and a second technique to be applied to the media content during a second period of time.

16. An apparatus as defined in claim 10, wherein the selector is to select the level of aggressiveness for the audio leveling technique based on information related to the media presentation device.

17. An apparatus as defined in claim 16, wherein the information related to the media presentation device includes at least one of a first user input corresponding to a channel change, a second user input corresponding to a volume change, or a third user input corresponding to a selection of one of a plurality of audio streams associated with the media content.

18. A media presentation system, comprising:
a receiver station including an audio leveler to apply an audio leveling technique to media content, the audio leveler implemented via a processor and including:
a presentation system information detector to detect a state of the media presentation system;
a technique selector to:
identify a measure of vulnerability of the media content to inappropriate audio leveling based on an indicator in closed captioning data corresponding to the media content; and
select one of a plurality of audio leveling techniques to be applied to the media content based on the measure of vulnerability, wherein the plurality of audio leveling techniques have different levels of aggressiveness; and
an audio level adjuster to apply the selected one of the plurality audio leveling techniques to the media content.

19. The media presentation system as defined in claim 18, wherein the technique selector is to:
select a first one of the audio leveling techniques having a first level of aggressiveness when the indicator of the closed captioning data indicates that a presentation of the media content has reached a first portion without dialogue; and
select a second one of the audio leveling techniques having a second level of aggressiveness greater than the first audio leveling techniques when the indicator of the closed captioning data indicates that the presentation of the media content has reached a second portion including dialogue.

20. The media presentation system as defined in claim 19, wherein the second audio leveling technique more drastically adjusts audio than the first leveling technique.

* * * * *